Aug. 24, 1965     E. AUGER ETAL     3,202,451
VEHICLE UNDERBODY STRUCTURE
Filed Aug. 18, 1960
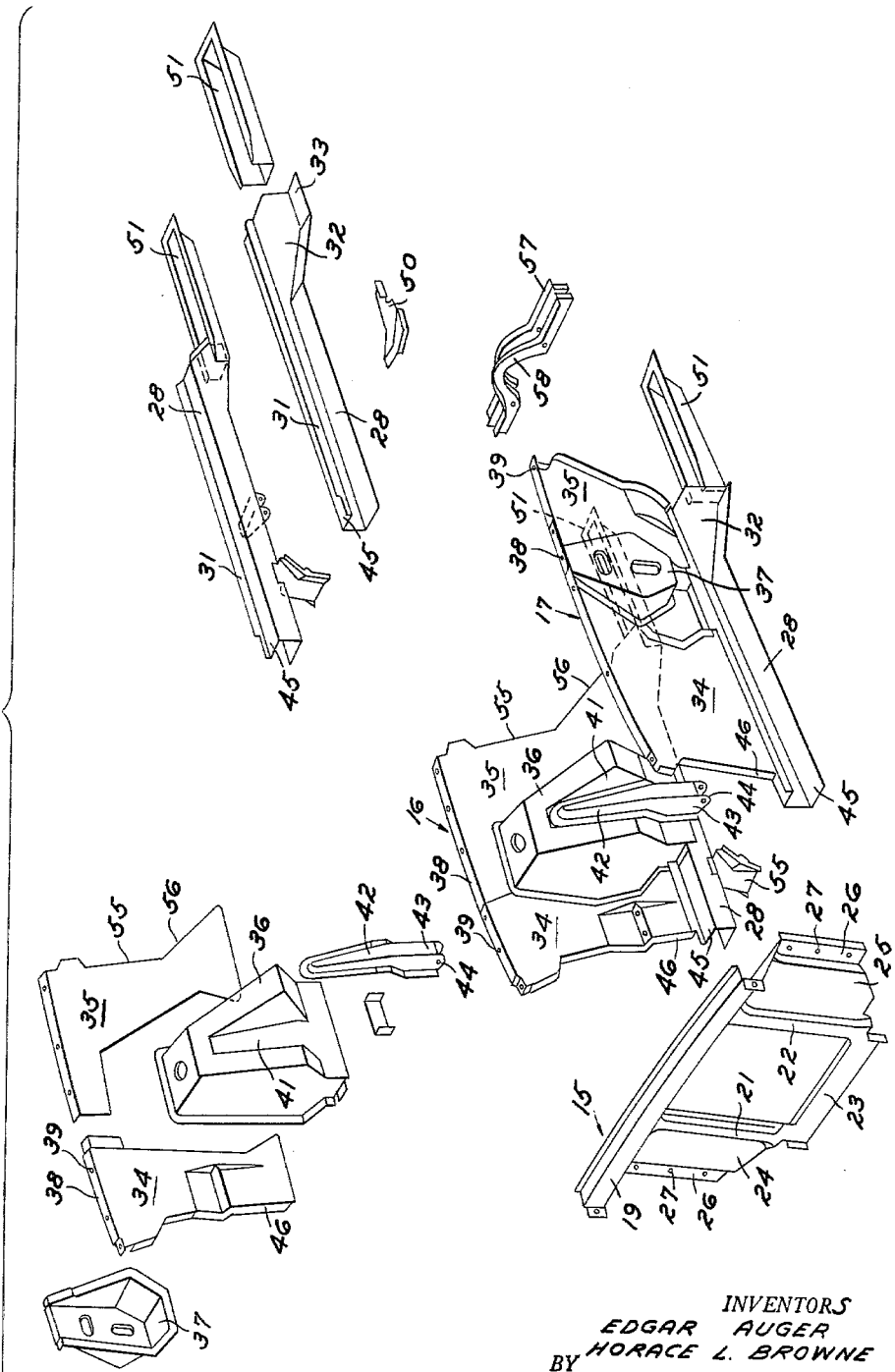
INVENTORS
EDGAR AUGER
HORACE L. BROWNE
BY
J. R. Faulkner
J. J. Roethel
ATTORNEYS

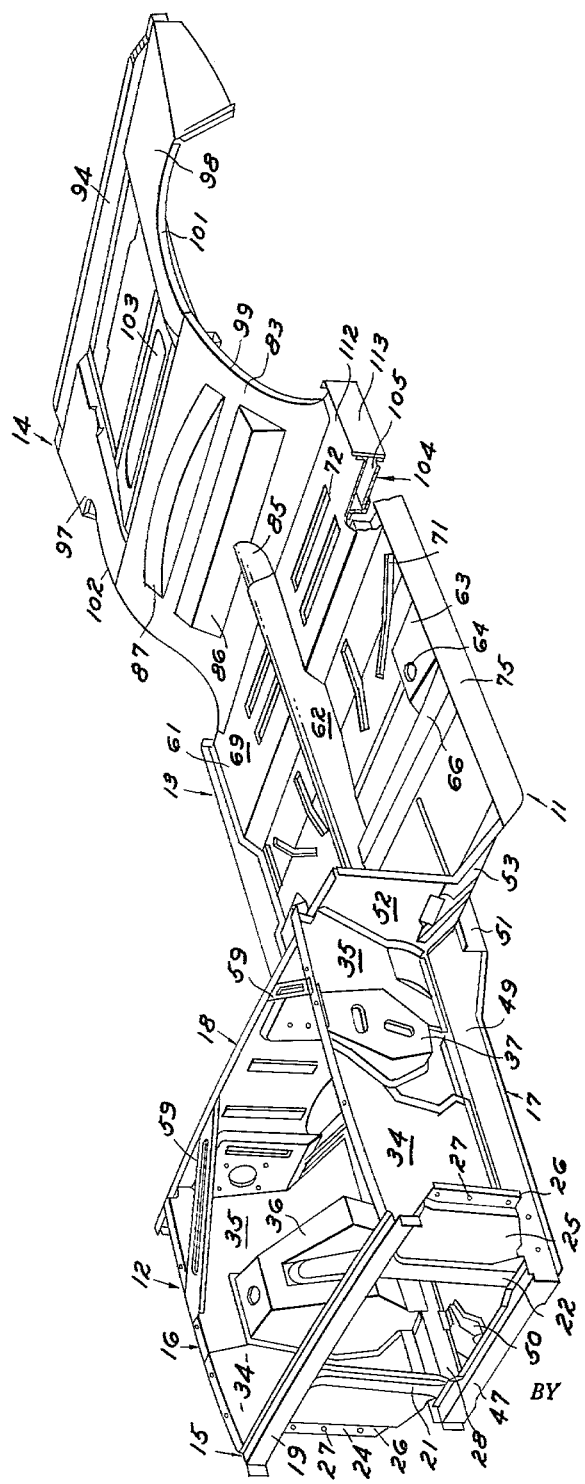

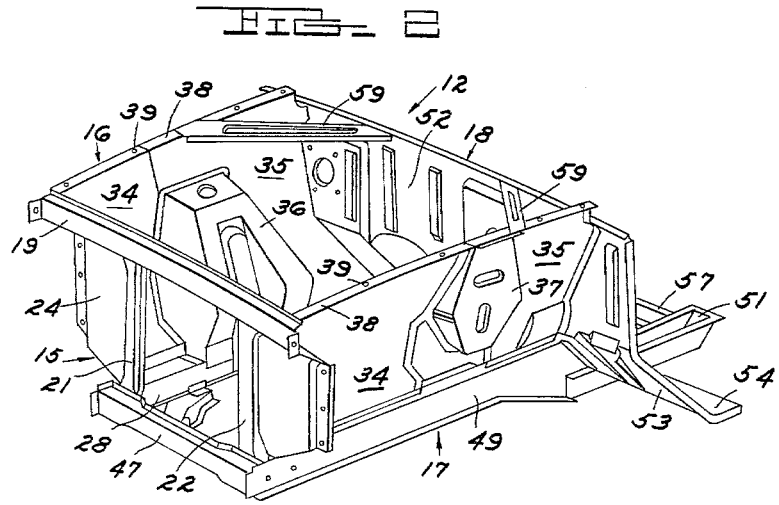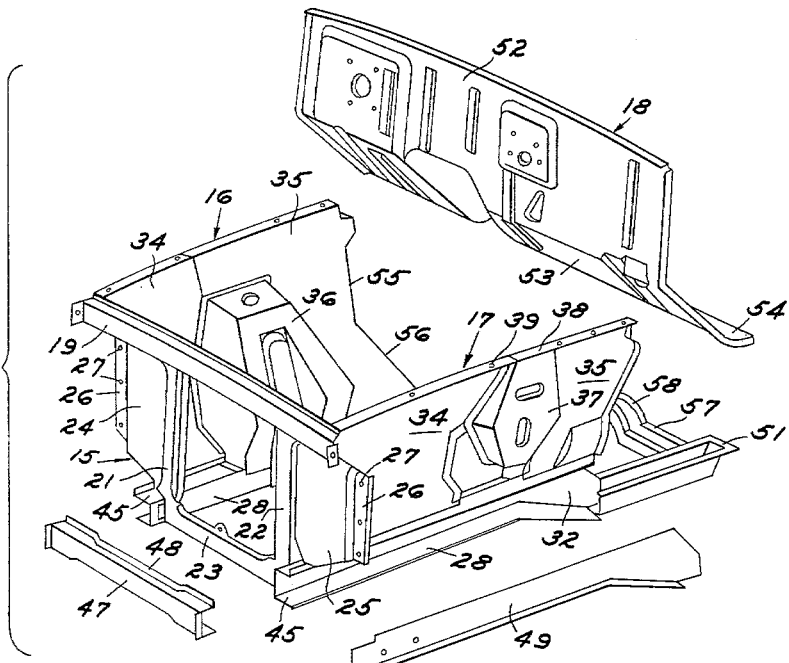

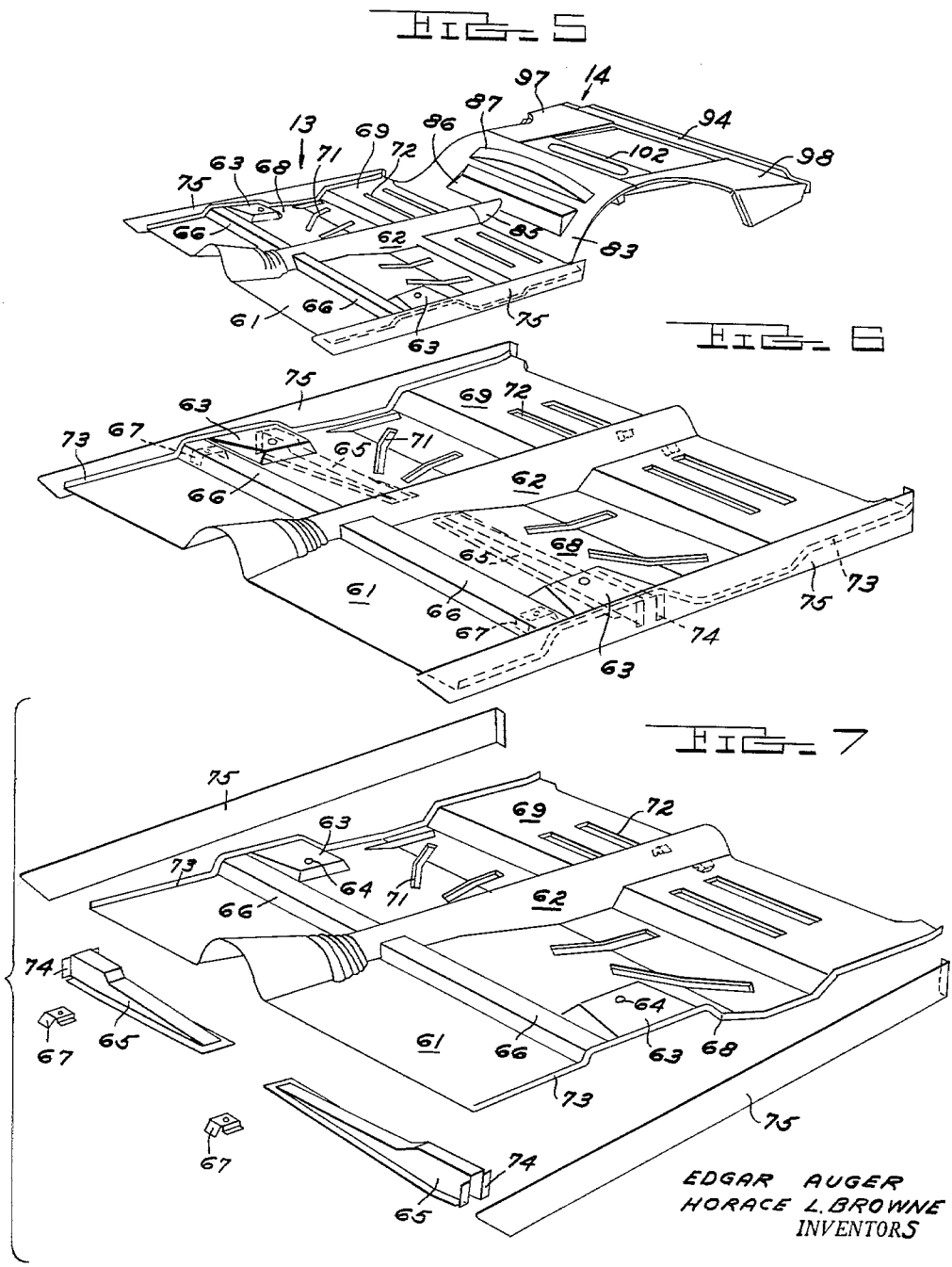

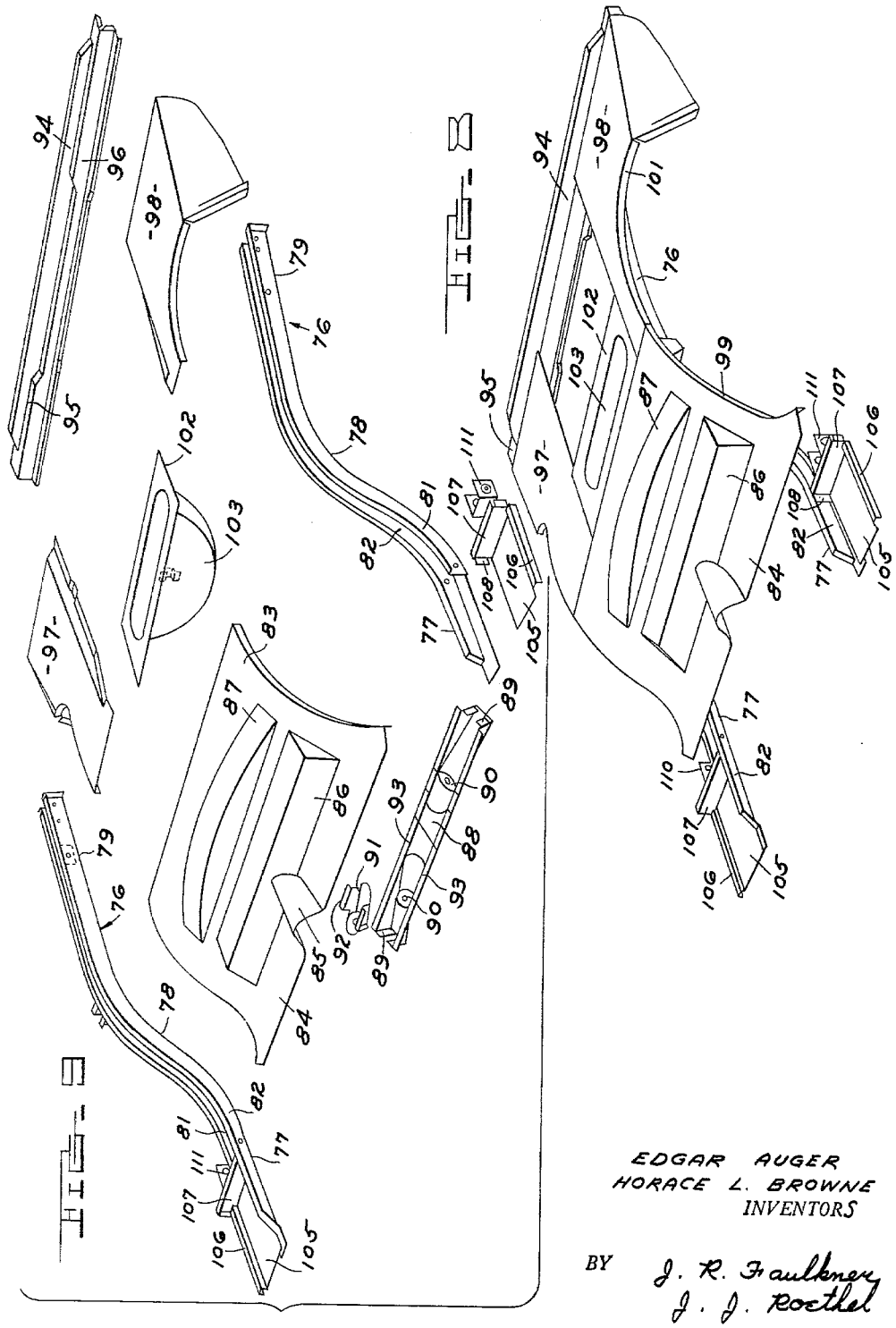

United States Patent Office 3,202,451
Patented Aug. 24, 1965

3,202,451
VEHICLE UNDERBODY STRUCTURE
Edgar Auger, Oak Park, and Horace L. Browne, Dearborn, Mich., assignors to Ford Motor Company, Dearborn, Mich., a corporation of Delaware
Filed Aug. 18, 1960, Ser. No. 50,500
6 Claims. (Cl. 296—28)

This invention relates generally to motor vehicle bodies, and more particularly to integral underbody structures of the frameless type.

The growing consumer demand for smaller size and less expensive motor vehicles, the so-called "compact" vehicles, has resulted in substantial revisions in the theories of vehicle body design. The popular assumption is that smaller size vehicles cost less to manufacture. Although a reduction in cost does result from the use of less material, production costs relate more directly to number of parts than to weight or size of parts. The only way that substantial savings in production and assembly costs can be achieved is by the elimination of structural elements or the integration of structural elements in such a manner as to eliminate the necessity for assembly operations, particularly those of the type which are relatively time consuming such as the bolting together of structural members.

The present invention, accordingly, has among its objects the provision of a strong, lightweight and easily and inexpensively manufactured construction for an integral underbody structure of the frameless type. More particularly, the underbody structure embodying the present invention comprises three subassembly units, comprising a front sheet metal assembly defining the engine compartment and providing support for the vehicle front wheel suspension components, a passenger compartment floor pan assembly and a floor pan assembly for the portion of the vehicle to rear of the passenger compartment. Each of the subassembly units of the underbody are fabricated of sheet metal structure elements which are formed and welded together to provide vehicle body components having desirable structural characteristics while at the same time performing functions ordinarily requiring additional structure and expense. After fabrication, the assembly units are joined to provide the integrated underbody structure embodying the present invention.

Some of the features of construction of the underbody structure embodying the present invention may be listed as follows:

First: The utilization of a torque box structure between the rear side member of the rear floor pan structure and the floor side member of the passenger compartment floor pan structure. Although the use of torque box applications to frame type structures has been indicated, the application to a unitized structure is believed novel. The normal procedure in unitized construction is to either use two cross members at this location, or to curve the rear side member to meet the floor side member. Either of these conventional approaches results in a substantial increase in weight of the underbody structure.

Second: The compartment floor pan is so constructed and arranged as to provide adequate support for the front seat of the vehicle. This is accomplished by utilizing the drive shaft tunnel as a longitudinal structural member. The cross member which supports the rear of the seat track bridges from the tunnel to the floor side members, and is tapered for maximum use of material. The cross member which supports the front of the seat is made by forming a channel offset in the floor, the channel offset bridging from the tunnel to the floor side members. This construction and arrangement eliminates an added part which is usually found in conventional unitized structures.

Third: The radiator and apron support of the front sheet metal structure is formd in such a way that it provides the structural strength and rigidity required in this area without the use of separate horizontal and vertical stiffening members.

Other objects, features and advantages of the present invention will appear in the following description and appended claims, reference being had to the accompanying drawings, in which:

FIG. 1 is a prespective view illustrating a vehicle underbody constructed in accordance with the present invention;

FIG. 2 is a perspective view of the front sheet metal assembly;

FIG. 3 is a partially exploded view of the structural members comprising the front sheet metal assembly illustrated in FIG. 2;

FIG. 4 is a progressively exploded perspective view illustrating the structural development of parts of the front sheet metal assembly;

FIG. 5 is a perspective view of the assembly of the passenger compartment floor panel and the rear floor panel;

FIG. 6 is an enlarged perspective view of the passenger floor compartment pan;

FIG. 7 is an exploded view illustrating the structural elements which make up the compartment floor pan assembly illustrated in FIG. 6;

FIG. 8 is an enlarged perspective view of the rear floor pan assembly; and

FIG. 9 is an exploded view illustrating the structural elements utilized in the assembly of the rear floor pan assembly illustrated in FIG. 8.

Referring now to the drawings, the underbody structure, generally designated 11, embodying the present invention comprises an assembly of three major components or assembly units. These are the front sheet metal assembly unit 12, the front floor pan assembly unit 13 and the rear floor pan assembly unit 14.

The front sheet metal assembly unit 12 comprises the framework defining the engine compartment of the vehicle body. More specifically, it comprises the various structural members on and to which the vehicle engine and its accessories and the vehicle front wheel suspension units are supported and attached. The front floor pan assembly unit 13 is the floor or support area beneath the passenger compartment, or, in other words, is the platform on which the seats for the vehicle passengers are supported. The rear floor pan 14 covers the area to the rear of the passenger compartment floor area and primarily provides the floor for the luggage compartment of the vehicle body. Each of these assembly units will be described in detail as will the manner in which they are structurally integrated to form the underbody structure 11.

The structural components comprising the front sheet metal assembly 12 are illustrated in FIGS 2 to 4, inclusive. Basically, the front sheet metal assembly 12 comprises four major fabrications: The front fender apron and radiator support 15, the front side member and apron assemblies 16 and 17, and the dash panel 18.

The front fender apron and radiator support 15 comprises a unitary sheet metal stamping formed in such a way that it provides the structural strength and rigidity required in this area without the use of separate horizontal and vertical stiffening members. The sheet metal along the upper edge is formed as a horizontal U-shaped channel section 19 extending across the width of the support. The opening of the channel section faces rearwardly. Depending from the horizontal channel section 19 are two spaced vertical channel sections 21 and 22. These are joined by a lower flanged horizontal member 23. The radiator opening is thus defined by the integral horizontal channel section 19, the vertical channel sections 21 and 22, and the lower horizontal member 23.

Extending outwardly from each vertical channel section 21 and 22 and downwardly from each end of the upper channel section 19 are formed wing sections 24 and 25, respectively. Each of these wing sections terminates in a flange 26 provided with suitable bolt holes 27 adapted to receive fastening devices for securing parts of the outer body shell to the underbody.

As best seen in FIG. 3, the radiator support 15 is assembled to front side members and apron assemblies 16 and 17. Each front side member and apron assembly 16 and 17 comprises a side rail 28 which is a U-shaped box channel section with the opening of the U facing laterally outwardly. Along its upper edge each side rail 28 is formed with a flange or lip 31 (see FIG. 4). At its rear end each side rail 28 is provided with an expanded channel section 32 terminating in a support flange 33. Each side rail 28 has welded to its upper surface an apron assembly comprising a front apron section 34, a rear apron section 35, a front suspension inner housing or pocket member 36 and a front suspension outer housing or bracket member 37 (see FIG. 4). All of these are provided with appropriate overlapping flanges for welding them into a unitized assembly.

The apron sections 35 and 36 are provided with aligned flanges which, when the apron sections are joined, result in a substantially horizontally extending flange 38 having a series of bolt holes 39 adapted to receive suitable fastening devices for retaining outer body shell components.

The front suspension inner housing or pocket member 36 and the front suspension outer housing or bracket member 37, when mounted in opposed relationship on the opposite sides of the apron sections, are adapted to house the coil suspension spring and shock absorber (not shown). It will be noted that each front suspension inner housing or pocket member 36 is provided with a formed recess or depression 41 which receives a channel shaped structural member 42 having an end portion 43 extending slightly below the lower edge of the side rail 28. This member is provided at its lower end with aligned apertures 44. The aligned apertures 44 are adapted to receive a pivot stud or shaft which pivotally connects the inner end of the lower front suspension arm to the side rail structure, the pivot shaft and lower front suspension arm not being shown.

The front end portions 45 of the side rails 28 extend forwardly of the front edges 46 of the front apron sections 34. These front end portions 45 provide support for the lower indented edges of the front fender apron and radiator support, as best seen in FIG. 3. When the front side member and apron assemblies 16 and 17 are fitted to the front fender apron and radiator support 15, the end portions 45 of the side rails 28 are substantially in alignment with the vertical channel sections 22 of the radiator support 15. This provides structural rigidity from the side rails up to the horizontal cross member or channel section 21 of the radiator support. Further structural reinforcement across the bottom of the radiator support and side rail assembly is provided by a front cross member 47 which is a box channel section. The end portions of this front cross member fit over the front end portions 45 of the side rails 28. The lips or flanges 48 of the front cross member 47 abut the front face of the horizontal member 23. When the front cross member 47 is welded in position across the bottom of the radiator support 15 and front side member and apron assemblies 16 and 17, it coacts with the horizontal member 23 to form a structural box section across the front of the vehicle underbody. Sheet metal members 49 shaped to fit the side rails 28 are provided and when welded across the open face of the side rails 28 complete the structural box section for these side rails. The front sheet metal assembly unit is thus provided around its side and front lower periphery with structural box sections providing torsional rigidity for the unit. Diagonal strength between the box sections formed by the side rails and the horizontal member 23 and front cross member 47 box section is provided by a diagonal member 50 located at each corner. Each diagonal member 50 has a further function in that it also acts as a support for a bracket for the front suspension strut mounting (not shown).

At their rear edges the two front side members and apron assemblies 16 and 17 are transversely connected by the dash panel member 18. With particular reference to FIG. 4, it will be noted that each side rail is provided with a U-shaped channel extension 51, the opening of the U being upwardly. These U-shaped channel extensions 51 embrace or encompass the end portion of the expanded channel section 32 of the side rails and are welded to and supported on the support flanges 33. The dash panel 18 is provided with a vertical upper panel section 52 and a rearwardly inclined lower panel section 53 which terminates in a horizontally extending flange portion 54. It will be noted that each rear apron section 35 is provided with correspondingly directed edge portions at least to the extent that it is provided with a substantially vertically extending edge portion 55 terminating in a rearwardly inclined edge portion 56. The dash panel vertical section 52 and its diagonally inclined section 53 are fitted against the corresponding edge portions 55 and 56, respectively, of the rear apron section 35 and the horizontally extending flange 54 of the dash rests on the upper flange lips of the side rail extensions 51.

The side rail extensions 51 are held in spaced parallel relationship to each other at their rear ends by a rigid engine support cross member 57. This cross member is a channel section provided with an intermediately curved portion 58 adapted to provide clearance for the rearwardly extending drive shaft of the engine and transmission unit. It is utilized to support the engine and transmission at the rear end thereof.

As best seen in FIG. 2, a pair of diagonally extending braces 59 are provided which extend between the upper corners of the front side member and apron assemblies 16 and 17 and the dash panel 18. These braces 59 provide diagonal strength for the apron assembly and dash panel.

This substantially completes the description of the front sheet metal assembly unit. It will be understood that other brackets and reinforcement elements may be provided where required for the mounting and connection to the front assembly of various suspension unit elements and engine and transmission elements. Some of these appendages may be welded in position on the front assembly at the time the various units comprising this assembly are fabricated.

Referring now to FIGS. 5 to 7, inclusive, the structural members comprising the front floor pan assembly unit 13 will now be described. The major structural component of the floor pan assembly 13 is the floor pan 61. The floor pan 61 comprises a large sheet metal panel having a tunnel 62 formed along its longitudinal axis. The tunnel 62 is used as the longitudinal structural member. The floor pan is provided at each side edge with raised platforms 63 to which the rear of the front seat tracks (not shown) are adapted to be bolted through the bolt holes 64 (see FIG. 7). The floor pan 61 is structurally reinforced at this area by two laterally extending floor cross members 65. These members, which are tapered U-shaped channel sections, bridge from the tunnel to the side edges of the floor pan. The cross member or channel section which supports the front of the front vehicle seat is made by forming channel offsets 66 extending from the tunnel to the side edges directly in the floor pan 61. This is a departure from conventional practice in which these cross members would be made from separate structural pieces. This departure results in a saving of material. Small apertured structural reinforcement pieces 67 are welded into the underside of the channel offsets 66 to receive the seat track hold-down bolts.

To the rear of the platform 63 the floor pan is downwardly offset as at 68 and then returns to a plane substantially coplanar with the plane of the platform 63 to provide the rear seat support platform 69. Suitable ribs 71 and 72 may be embossed in the floor pan sections 68 and 69 to provide structural rigidity and to prevent any tincanning effect occuring when weight is applied to these areas of the floor pan. At each side the floor pan 61 is provided with longitudinally extending flanges 73. These flanges in cooperation with the flanged ends 74 of the floor cross members 65 are spot welded to longitudinally extending sheet metal side members 75 which cooperate with the tunnel to provide rigidity of the floor pan 61.

This front floor pan assembly unit 13 is adapted to be superimposed at its forward end over the side rail extensions 51 and the engine support member 57. It will be noted that the sheet metal side members 75 of the floor pan assembly 13 extend a short distance forward of the floor pan 61 and, when assembled to the front sheet metal assembly unit 12, overlie the flanged edges of the dash 18. This, of course, provides additional overlapped area for spot welding.

Before the front floor pan assembly unit 13 is assembled to the front sheet metal assembly unit 12, the rear floor pan assembly unit 14 is preferably integrated with it as shown in FIG. 5.

The rear floor pan assembly unit 14 extends from the rear edge of the front floor pan assembly 13 up and over and beyond the rear axle of the vehicle to provide the floor area of the luggage compartment of the vehicle body. The structural components are best seen in FIGS. 8 and 9. It will be noted that the rear floor pan assembly 14 comprises a pair of side rails 76. Each side rail 76 is a U-shaped channel section with the open side facing upwardly. Each rail is provided with a substantially horizontal forward end section 77 which blends into an upwardly and then rearwardly curved intermediate section 78 leading to a substantially horizontal terminal section 79. It will be noted that the outer channel wall 81 of each side rail 76 begins at a point substantially at the terminal end of the horizontal forward end section 77, while the inner channel wall 82 extends substantially the full length of the side rail, for a reason to be explained.

The side rails 76 are bridged by a sheet metal center floor pan 83. This pan 83, except for a flat transversely extending leading edge section 84, is curved to the contour of the intermediate section 78 of the side rails. The portions of the floor pan 83 contiguous to the side rails 76 coact with the channel sections of the latter to form integrated box channel structural members. The center floor pan 83 is provided with a short tunnel section 85 extending longitudinally from its leading edge. The tunnel section 85 provides a short extension of tunnel 62 in the floor pan 61. Rearwardly of the tunnel section 85, the center floor pan 83 is laterally embossed at 86 for structural rigidity.

Rearwardly and above the embossment 86 is a second embossment 87 beneath which a structural cross member 88 is adapted to be positioned. The member 88 is a box channel section which tapers toward the center from both ends. It is provided with flanges 89 on its end portions adapted to be spot welded to the side rails 76. The embossment 87 and the structural member 88 cooperate to provide a rigid floor pan area to which the upper ends of the rear shock absorbers of the vehicle (not shown) are adapted to be attached. As shown in FIG. 9, the structural member 88 is formed near each end with an apertured circular tab 90 which is structurally reinforced by a reinforcement member 91. The reinforcement member is substantially U-shaped and provided with flanges 92 adapted to be spot welded to the lip flanges 93 on the structural member 88.

The two side rails 76 are bridged at their ends by a rear cross member 94. This member is provided with a stepped flange upper surface 95. The end faces of the side rail 76 are spot welded to the front face 96 of the rear cross member 94 at locations somewhat inwardly of the ends of the latter. Overlying the side rails 76 and the upper surface 95 of the rear cross member 94 are a right and a left-hand rear floor side pan 97 and 98, respectively.

It will be noted that the flanged side edge 99 of the center floor pan 83 and the flanged edge 101 of the side pan 98 provide an arcuate pocket extending inwardly of the underbody structure. This is to accommodate the rear wheel housing (not shown) which is formed as a part of the vehicle upper body structure or shell. A corresponding pocket is formed on the other side of the floor pan 83 and the right-hand side pan 97.

Partially bridging the opening between the two side pans 97 and 98 to the rear of the center floor pan 83 is a flanged member 102 having a deep semicylindrical pocket 103. This is the spare tire well. The floor pan to the rear of the spare tire well and between the side pans 97 and 98 incorporates the top surface of the fuel tank (not shown) as one section of the floor section. The fuel tank is bolted to the body, and its cellular form adds structural value to the rear floor area.

As best seen in FIG. 8, the side edges of the center floor pan 83 overhang the side rails 76. Also, as seen in FIGS. 1 and 5, the floor pan 61 is somewhat wider than the center floor pan 83. The forward end sections 77 project beneath the floor pan 61 and are spaced somewhat inwardly of the side edges of the latter. This relationship provides accommodation for a construction which is known as a torque box.

The utilization of a torque box application to a unitized structure is an important feature of the present invention. Each torque box, generally designated 104 (see FIG. 1), comprises structural elements of the front floor pan assembly unit 13 and the rear floor assembly unit 14. Referring first to FIGS. 8 and 9, each side rail 76 of the rear floor pan assembly unit 14 is provided with an outwardly laterally extending extension member 105. The extension member 105 is a sheet metal plate provided with a flange 106 along its outer longitudinal edge and a flange 107 along its rear lateral edge. The flange 106 is provided with suitable welding tabs as indicated at 108. The inner edge of the extension member 105 is positioned and secured in overlapping relation to the base 109 and the welding tab 108 is welded to the inner wall 82 of the side rail 76.

The rear face of each flange 107 is utilized as a support for the rear spring front hanger brackets 111. As was mentioned earlier, it will be understood that various other brackets and appendages will be secured to the various rails and floor panel members. These brackets and appendages are required to receive the various other components of the vehicle such as parts of the wheel suspension units, driveline components and outer body shell components.

As perhaps best seen in the cutaway portion of FIG. 1, each torque box 104 is completed by a rear corner section 112 of the floor pan 61 and the rear end portion 113 of the side member 75. These members or sections are spot welded or otherwise secured to the abutting flanges on the side rails 76 and the extension member 105, the flange 106 in the case of the latter member. After the various abutting members have been spot welded together, the construction and arangement at each rear corner of the front floor pan assembly unit has a box-like configuration or cross section.

This torque box construction provides a connection between the front and rear floor panel units having the desired structural characteristics at a minimum weight factor. Conventional practice has been to use two cross members at this location or to curve the rear side rail to meet the floor side member. That is, the side rail 76 would be curved to meet the side member 75 or its equivalent. Either of these approaches causes a substantial increase of weight over the construction and arrangement disclosed herein.

The above described underbody construction is economical and is relatively light in construction, yet it possesses the required strength and torsional rigidity for modern vehicle construction. It also provides clearance for vehicle components such as the engine transmission and driveline, and provides foot room for the front and rear passengers of the vehicle. The economies in construction are achieved by the elimination of as many members as possible. In other words, the underbody construction embodying the present invention is not merely a reduction in size of underbody constructions used on larger vehicles. The present invention achieves its objectives by the manner in which the various components are designed to function as multipurpose structural members, and where structures could be simplified, parts were eliminated.

It will be understood that the invention is not to be limited to the exact construction shown and described, but that various changes and modifications may be made without departing from the spirit and scope of the invention as defined in the appended claims.

We claim:

1. A vehicle underbody floor pan assembly comprising a passenger floor pan unit and a rear floor pan unit forming an extension of said passenger floor pan unit, said passenger compartment floor pan unit comprising a formed panel having a drive shaft tunnel forming a longitudinal structural member thereof, said rear floor pan unit being provided with a pair of spaced channel sections forming longitudinally extending side rails, said side rails terminating beneath said formed panel inwardly of the rear and lateral edges of the latter and in parallel spaced relationship to said drive shaft tunnel, and torque box means coupling said floor pan units together, said torque box means comprising the outer rear corners of said formed panel, the parts of said side rails extending therebeneath, and sheet metal members attached thereto to complete structural box sections contiguous to said formed panel rear corners.

2. A vehicle underbody assembly comprising a front unit adapted to receive a vehicle engine and front wheel suspension units, a passenger compartment floor pan unit and a rear floor pan unit, said passenger compartment floor pan unit comprising an integral formed sheet metal panel provided with a drive shaft tunnel forming the longitudinal structural member thereof, said front unit having a pair of spaced parallel box channel sections forming longitudinally extending side rails thereof, each side rail having an upwardly opening channel section terminating beneath the forward end of said sheet metal panel and welded thereto laterally equidistantly of said drive shaft tunnel, the contiguous portions of said side rail channel sections and said sheet metal panel forming box channel structural members integrally connecting said front unit to said passenger compartment floor pan unit, said rear floor pan unit being provided with a pair of spaced parallel channel sections forming longitudinally extending side rails, said rear unit side rails terminating beneath the rear end of said sheet metal panel inwardly of the lateral edges of the latter equidistantly of said drive shaft tunnel, and torque box means integrally attaching said floor pan units together, said torque box means comprising the outer rear corners of said sheet metal panel, parts of said rear unit side rails extending therebeneath, and sheet metal members attached thereto to complete structural box sections contiguous to said rear corners of said sheet metal panel.

3. A vehicle underbody assembly comprising a front unit adapted to receive a vehicle engine and front wheel suspension units, a passenger compartment floor pan unit and a rear floor pan unit, said passenger compartment floor pan unit comprising an integral formed sheet metal panel provided with a drive shaft tunnel forming the longitudinal structural member thereof, said front unit having a pair of spaced parallel channel sections forming longitudinally extending side rails thereof, each side rail having an extension terminating beneath said sheet metal panel and welded thereto laterally equidistantly of said drive shaft tunnel, said sheet metal panel and side rail extensions therebeneath forming box channel structural members integrally connecting said front unit to said passenger compartment floor pan unit, a channel section cross member extending between said side rail extensions, the ends of said cross member being welded to said side rail extensions, said cross member having an arcuate center section complementary to the drive shaft tunnel and fitted therein, said cross member being welded to said passenger compartment floor pan to form a closed box section structural member, said rear floor pan unit being provided with a pair of spaced parallel channel sections forming longitudinally extending side rails, said last mentioned side rails terminating beneath said sheet metal panel inwardly of the lateral edges of the latter equidistantly of said drive shaft tunnel, and torque box means integrally attaching said passenger compartment and rear floor pan units together, said torque box means comprising the outer rear corners of said sheet metal panel, the parts of said rear unit side rails extending therebeneath, and sheet metal members attached thereto to complete structural box sections contiguous to said rear corners of said sheet metal panels.

4. A vehicle underbody assembly comprising a front unit defining an engine compartment and front wheel suspension support structure, said front unit including longitudinally extending spaced side rails at the base thereof, said side rails having stub portions extending rearwardly of the engine compartment, a passenger compartment floor pan unit extending rearwardly of said front unit, said floor pan unit comprising a formed panel defining laterally extending front and rear seat support platform areas and a longitudinally extending centrally located drive shaft tunnel forming the main structural member thereof, said stub portions of said side rails terminating forwardly of the front platform area and being welded to said formed panel to integrally connect said front unit to said passenger compartment floor pan unit, a rear floor pan unit extending rearwardly of said passenger compartment floor pan unit, said rear floor pan unit including a pair of longitudinally extending spaced side rails having forwardly extending portions which terminate beneath said rear support platform area, and torque box means coupling said floor pan units together, said torque box means comprising structural members including said forwardly extending portions and the outer rear corners of said formed panel.

5. A vehicle underbody assembly comprising a front unit defining an engine compartment and a front wheel suspension support structure, said front unit including longitudinally extending spaced side rails at the base thereof, said side rails having stub portions extending rearwardly of the engine compartment, a passenger compartment floor pan unit extending rearwardly of said front unit, said floor pan unit comprising a formed panel defining laterally extending front and rear seat support platform areas and a longitudinally extending, centrally located drive shaft tunnel forming the main structural member thereof, said stub portions terminating forwardly of the front platform area and being welded to said formed panel to integrally connect said front unit to said passenger compartment floor pan unit, said side rail stub portions being positioned in equidistant relationship to said drive shaft tunnel and inwardly of the side edges of said formed panel, a rear floor pan unit extending rearwardly of said passenger compartment floor pan unit, said rear floor pan unit including a pair of longitudinally extending spaced side rails having forwardly extending portions which terminate beneath said rear seat support platform, said rear floor pan unit side rail portions, being positioned in equidistant relationship to said drive shaft and inwardly of the side edges of said formed panel, and torque box means comprising structural members including said rear floor pan unit side rail portions and the corners of said formed panel outwardly thereof.

6. A vehicle underbody assembly comprising a front unit defining an engine compartment and front wheel suspension support structure, said front unit including longitudinally extending spaced side rails at the base thereof and a cowl panel member defining the rear wall thereof, said side rails having stub extensions rearwardly of said cowl panel member, a passenger compartment floor pan unit extending rearwardly of said front unit, said floor pan unit comprising a panel formed with laterally extending front and rear seat support platform areas and a longitudinally extending, centrally located drive shaft tunnel, a portion of said panel forwardly of said front seat support platform overlying said side rail stub extensions, said side rail stub extensions being welded to the underside of said portion of the panel in equidistant relationship to said drive shaft tunnel and inwardly of the side edges of said panel to integrally connect said front unit to said passenger compartment floor pan unit, a rear floor pan unit extending rearwardly of said passenger compartment floor pan unit, said rear floor pan unit including a pair of longitudinally extending side rails having forward extensions which terminate beneath said rear support platform, said forward extensions being attached to the underside of said panel in equidistant relationship to said drive shaft and inwardly of the side edges of said panel, and torque box means coupling said floor pan units together, said torque box means comprising structural members including said forward extensions and the corners of said panel outwardly of said forward extensions.

References Cited by the Examiner

UNITED STATES PATENTS

| 2,108,191 | 2/38 | Begg | 296—28.4 |
| 2,645,519 | 7/53 | Stanfield | 296—28 |
| 2,654,634 | 10/53 | Zummach | 296—28 |
| 2,662,794 | 12/53 | Lindsay | 296—28 |
| 2,711,340 | 6/55 | Lindsay | 296—28 |
| 2,715,448 | 8/55 | Zeeb | 180—68 |
| 2,733,096 | 1/56 | Waterhouse | 296—28 |
| 2,864,647 | 12/58 | Chesna | 296—28 |
| 2,954,998 | 10/60 | Kushler | 296—28 |
| 3,021,172 | 2/62 | Fiala | 296—28 |

FOREIGN PATENTS 958,361  12/53  Germany.

MILTON BUCHLER, *Primary Examiner.*

PHILIP ARNOLD, A. HARRY LEVY, *Examiners.*